Figure 1:
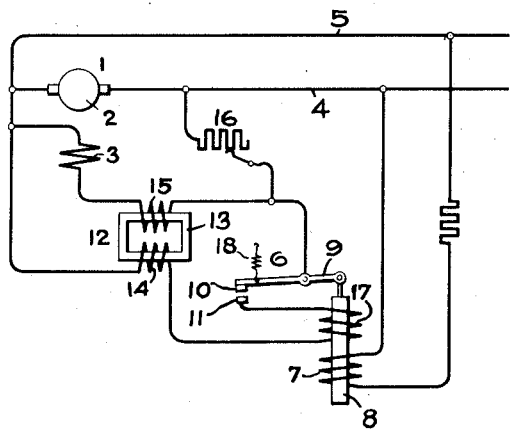

L. W. THOMPSON.
REGULATING SYSTEM.
APPLICATION FILED JAN. 29, 1920.

1,360,822.

Patented Nov. 30, 1920.

Inventor:
Louis W. Thompson,
by Albert G. Davis
His Attorney.

UNITED STATES PATENT OFFICE.

LOUIS W. THOMPSON, OF SCHENECTADY, NEW YORK, ASSIGNOR TO GENERAL ELECTRIC COMPANY, A CORPORATION OF NEW YORK.

REGULATING SYSTEM.

1,360,822.  Specification of Letters Patent.  Patented Nov. 30, 1920.

Application filed January 29, 1920. Serial No. 354,973.

*To all whom it may concern:*

Be it known that I, LOUIS W. THOMPSON, a citizen of the United States, residing at Schenectady, county of Schenectady, State of New York, have invented certain new and useful Improvements in Regulating Systems, of which the following is a specification.

My invention relates to voltage regulating systems for direct current dynamo-electric machines, and particularly to regulating systems of the type employing a vibratory device for controlling the excitation of the machine.

It has been found that when a regulating system of the above type is used, a very abrupt change in the voltage of the machine is produced each time the field circuit is changed by the operation of the vibratory device. This is due to the fact that the current in the field winding of the machine changes so rapidly in response to the operation of the vibratory device that the voltage of the machine will decrease below or increase above the predetermined value a certain amount, depending upon the operation of the vibratory device, before the vibratory device can operate again to change the field circuit to restore the voltage to the predetermined value. Since it has been impossible to obtain a vibratory device which will respond quick enough to prevent these variations in the field current and the consequent voltage variations, the resulting voltage curve of the machine has a saw tooth or wavy appearance. These abrupt variations in voltage are not large enough to be serious when the machine supplies electrical energy for most purposes, but when a constant voltage is required, as in the case where very delicate measuring instruments are used, these variations become objectionable and it is very desirable to eliminate them. It is, therefore, an object of my invention to provide means whereby these undesirable variations in the voltage of a direct current dynamo-electric machine are prevented.

In accordance with my invention, I provide means for temporarily opposing the tendency of the current through the field winding of the dynamo-electric machine to change, due to variations in the field circuit produced by the vibratory device. In its preferred form this means comprises an induction device having its primary winding connected so that its energization will vary in accordance with the variations in the field current produced by the vibratory device, and a secondary winding arranged so that the voltages, induced therein by the variations of current in the primary winding, oppose and thereby temporarily counteract the effect of the operation of the vibratory device on the current through the field winding of the machine.

Figure 2:
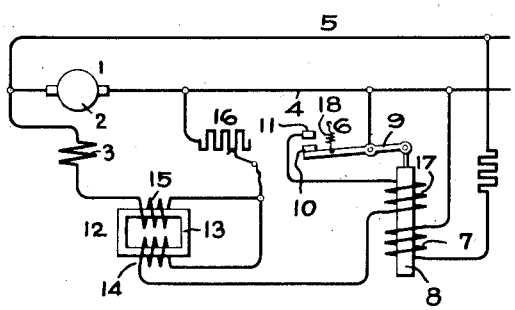

In the accompanying drawing Figure 1 is a diagram showing one embodiment of my invention, the contacts of a vibratory device being adapted to control a shunt circuit around the field winding of a dynamo-electric machine, and Fig. 2 is a modification of the arrangement shown in Fig. 1, the contacts of the vibratory device being adapted to control a shunt circuit around a resistance connected in series with the field winding of the dynamo-electric machine.

Referring to the drawing, wherein similar parts are designated by similar characters, 1 represents a direct current generator having an armature 2 and a shunt field winding 3. The generator 1 is connected so as to supply current to supply mains 4 and 5. 6 represents a vibratory device having a winding 7 connected across the mains 4 and 5, a movable core 8, a movable arm 9 connected to be actuated by said core, a movable contact 10 connected to be actuated by said arm, and a stationary contact 11 coöperating with the movable contact 10. A spring 18 is connected to the arm 9 in opposition to the pull exerted by the core 8.

12 represents an induction device, and preferably is a transformer, having a core 13 of magnetic material, a primary winding 14 and a secondary winding 15 which is connected in series with the field winding 3. An adjustable resistance 16 is also connected in the field circuit. The primary winding 14 is connected in series with an anti-hunting coil 17 associated with the vibratory device 6.

In Fig. 1 the movable contact 10 is connected to a point between the secondary winding 15 and the variable resistance 16; and the stationary contact 11 is connected to one end of the circuit including the primary winding 14 and the anti-hunting winding 17, the other end of this circuit being connected to the left hand brush of the generator 1, as viewed in the drawing. It will be observed, therefore, that when the contacts 10 and 11 are in engagement, they complete a shunt circuit around the field 3 and the secondary winding 15.

In Fig. 2 the movable contact 10 is connected to the right hand brush of the generator 1, as viewed in the drawing and the stationary contact 11 is connected to one end of the circuit including the primary winding 14 and the anti-hunting winding 17, the other end being connected to a point between the secondary winding 15 and the resistance 16. It will be observed, therefore, that in this figure the contacts 10 and 11, when in engagement, complete a shunt circuit around the resistance 16.

The operation of the modification shown in Fig. 1 as at present understood is as follows; assume that the voltage of the generator 1 starts to increase above the predetermined value, and that the contact 10 has just engaged stationary contact 11.

Upon the engagement of the contacts 10 and 11 current begins to flow through the primary winding 14 of the transformer 12 and the current through the secondary winding 15 and the field winding 13 tends to decrease. The building up of the current in the primary winding 14, however, induces a voltage in the secondary winding 15 which is so arranged on the core 13 relative to the winding 14 that this induced voltage opposes the tendency of the field current to change. Furthermore, it will be observed that upon the engagement of the contacts 10 and 11, the anti-hunting coil 17 is energized and as this coil is wound differentially with respect to coil 7, the resultant flux in the core 8 is decreased. Thereupon the spring 18 and the weight of the core cause the contacts 10 and 11 to separate. This separation of the contacts takes place before the current through the primary winding 14 has become constant, and therefore before the current through the field winding 3 has changed materially.

At the instant that the contact 10 moves out of engagement with contact 11, the reverse action takes place, viz., the current through the primary winding 14 begins to decrease and the current through the winding 3 and the secondary winding 15 tends to increase. The decrease in current through the primary winding 14 induces a voltage in the secondary which temporarily opposes the tendency of the current through the field winding 3 to increase, and therefore, the field current remains approximately constant. Upon the disengagement of the contacts 10 and 11, the anti-hunting coil 17 becomes deënergized and coil 7 again moves the contact 10 into engagement with contact 11 and the above cycle of operation is repeated.

In case the speed of the generator or the load changes so that the voltage across the mains 4 and 5 drops, the rate of vibration of the contact 10 is changed to increase the field current, but as soon as the rate of vibration has been adjusted, so that the correct field current flows through the field winding 3 to maintain the voltage at the predetermined value, the above cycle of operation is repeated to maintain the new value of field current constant as long as the load and speed remain constant. In a similar manner when the voltage increases due to a change in the load or the speed of the generator, the rate of vibration of the contact 10 is increased so that the field current is decreased to a value to maintain the predetermined voltage under the new conditions and then the above cycle of operation is repeated to maintain the new value of field current and, consequently, the voltage constant.

The operation of the modification shown in Fig. 2 is substantially the same as that of Fig. 1. It is believed that a detailed description thereof is unnecessary, but that it will be sufficient to point out only how it differs from Fig. 1. In Fig. 2 the contacts 10 and 11 are in engagement when the voltage across 4 and 5 is below the predetermined value, and out of engagement when the voltage is above the predetermined value. The engagement of the contacts 10 and 11 tends to increase the field current because the resistance 16 is short circuited instead of the field winding 3 as in Fig. 1. Therefore, the windings 14 and 15 are arranged so that when the current in primary winding 14 increases due to the engagement of contacts 10 and 11, the voltage induced in the secondary winding 15 opposes temporarily the increase of current through the field winding, and when the current through primary winding 14 decreases due to the disengagement of contacts 10 and 11, the voltage induced in the secondary winding 15 opposes temporarily the decrease of the field current. The anti-hunting coil 17 in this modification, aids coil 7 so that upon engagement of the contacts 10 and 11 the force tending to separate the contacts is increased.

While I have shown and described two modifications of my invention, it will be readily seen that various other modifications may be made, and I, accordingly desire to cover in the appended claims all such modifications as fall within the scope and spirit of my invention.

What I claim as new and desire to secure by Letters Patent of the United States, is,—

1. The combination with a dynamo electric machine, and a vibratory device responsive to an electrical condition of said machine for controlling the excitation of said machine, of a transformer connected so that the voltage induced in the secondary winding thereof varies in accordance with the current variations produced by said vibratory device and opposes the tendency of the current through the field winding of said machine to change due to the operation of said vibratory device.

2. The combination with a dynamo electric machine, and a vibratory device responsive to an electrical condition of said machine for controlling the excitation of said machine, of a transformer having its primary winding connected so that the current therein is varied by the operation of said vibratory device, and its secondary winding connected in the field circuit of said machine so that the voltages induced in said secondary winding by variations in the current in said primary winding oppose the tendency of the current in said field winding to change due to the operation of said vibratory device.

3. The combination with a dynamo electric machine and a vibratory device responsive to an electrical condition of said machine for opening and closing a shunt circuit around a portion of the field circuit of said machine to vary the excitation thereof, of a transformer connected so that the voltage induced in the secondary winding thereof varies in accordance with the current variations produced by the operation of said vibratory device and opposes the effect on the excitation of said machine of opening and closing said shunt circuit.

4. The combination with a dynamo electric machine, and a vibratory device responsive to an electrical condition of said machine for opening and closing a shunt circuit around a portion of the field circuit of said machine to vary the excitation thereof, of a transformer having its primary winding in said shunt circuit and its secondary winding connected to the field winding of said machine to oppose the effect on the excitation of said machine of opening and closing said shunt circuit.

5. The combination with a dynamo electric machine having a field winding, and a vibratory device responsive to an electrical condition of said machine for opening and closing a shunt circuit around said field winding to vary the field current of said machine, of a transformer having its primary winding in said shunt circuit and its secondary winding connected to the field winding to oppose the effect of opening and closing said shunt circuit on the current through the field winding of said machine.

In witness whereof I have hereunto set my hand this 27th day of January, 1920.

LOUIS W. THOMPSON.